United States Patent
Gembala

(10) Patent No.: US 7,765,757 B2
(45) Date of Patent: Aug. 3, 2010

(54) DEVICE AND METHOD FOR REINFORCING ATTACHMENT OF LIGHTWEIGHT INSULATING CONCRETE TOP COAT TO AN UNDERLYING ROOF DECK IN A ROOF SYSTEM

(76) Inventor: Henry Gembala, 6751 N. Federal Hwy., Ste #302, Boca Raton, FL (US) 33487

( * ) Notice: Subject to any disclaimer, the term of this patent is extended or adjusted under 35 U.S.C. 154(b) by 243 days.

(21) Appl. No.: 11/985,163

(22) Filed: Nov. 13, 2007

(65) Prior Publication Data

US 2008/0110119 A1    May 15, 2008

Related U.S. Application Data

(60) Provisional application No. 60/858,321, filed on Nov. 10, 2006.

(51) Int. Cl.
*E04B 1/74* (2006.01)
*E04B 5/00* (2006.01)
*E04G 23/00* (2006.01)

(52) U.S. Cl. .................... 52/410; 52/408; 52/404.2; 52/746.11

(58) Field of Classification Search ................ 52/404.2, 52/432, 410, 408, 746.11; 411/82, 107, 930, 411/171

See application file for complete search history.

(56) References Cited

U.S. PATENT DOCUMENTS

| | | | | |
|---|---|---|---|---|
| 3,138,899 | A | * | 6/1964 | Hadley ...................... 52/483.1 |
| 3,378,972 | A | * | 4/1968 | Stanley ....................... 52/309.2 |
| 3,670,917 | A | * | 6/1972 | Nishimaki et al. ...... 220/560.15 |
| 4,288,951 | A | * | 9/1981 | Carlson et al. .................. 52/94 |
| 4,558,552 | A | * | 12/1985 | Reitter, II ................ 52/745.19 |
| 5,546,723 | A | * | 8/1996 | Jones ........................... 52/698 |
| 5,778,623 | A | * | 7/1998 | Powell ........................ 52/410 |
| 5,787,668 | A | * | 8/1998 | Carkner et al. ................ 52/408 |
| 7,353,642 | B1 | * | 4/2008 | Henriquez ............... 52/741.41 |
| 2005/0196253 | A1 | * | 9/2005 | Nebesnak et al. ........... 411/531 |
| 2007/0204542 | A1 | * | 9/2007 | Gembala .................... 52/302.1 |
| 2007/0234669 | A1 | * | 10/2007 | Gembala ..................... 52/410 |
| 2008/0000177 | A1 | * | 1/2008 | Siu ............................... 52/319 |
| 2008/0127605 | A1 | * | 6/2008 | Gembala ................. 52/745.06 |
| 2009/0188208 | A1 | * | 7/2009 | Studebaker et al. ........... 52/852 |

* cited by examiner

*Primary Examiner*—Richard E Chilcot, Jr.
*Assistant Examiner*—Ryan D Kwiecinski
(74) *Attorney, Agent, or Firm*—Robert M. Downey, P.A.

(57) ABSTRACT

In a roof system, a top coat of lightweight insulating concrete is anchored to an underlying base slurry coat of lightweight concrete and a metal, gypsum, tectum or concrete roof deck by installing anchoring devices at spaced intervals. The anchoring devices may be made of plastic, steel or aluminum and include a threaded shank extending upwardly from a base plate. The anchoring devices are installed by fastening the base plates to the underlying roof deck structure or by setting the base plates in the lightweight base concrete slurry coat so that the threaded shanks of the anchoring devices extend upwardly through holes in EPS board insulation and into the subsequently applied top coat of lightweight insulating concrete. The base plate and threaded shank effectively anchor the attachment of the lightweight insulating concrete top coat to the underlying base slurry coat and roof deck to enhance resistance to wind uplift forces.

7 Claims, 1 Drawing Sheet

DEVICE AND METHOD FOR REINFORCING ATTACHMENT OF LIGHTWEIGHT INSULATING CONCRETE TOP COAT TO AN UNDERLYING ROOF DECK IN A ROOF SYSTEM

This non-provisional patent application is based on provisional patent application Ser. No. 60/858,321 filed on Nov. 10, 2006.

BACKGROUND OF THE INVENTION

1. Field of the Invention

This invention relates to roofing systems, and, more particularly, to reinforcing the attachment of the top coat of lightweight insulating concrete to an underlying lightweight concrete slurry coat and roof deck structure to provide greater resistance to wind uplift forces.

2. Discussion of the Related Art

Currently, lightweight insulating concrete is installed over metal, gypsum, tectum or concrete roof decks by applying a ½ inch to ¾ inch slurry coat of lightweight concrete into which a layer of EPS (expanded poly styrene) board insulation is placed. The EPS ridged board insulation has three inch diameter holes formed through its thickness in a spaced arrangement. The holes in the EPS board insulation allow the slurry coat of lightweight concrete to mate with a subsequently applied two inch top coat layer of lightweight insulating concrete. This attaches the top coat of lightweight concrete to the underlying slurry coat, with the EPS board insulation encapsulated therebetween. The slurry coat is poured directly on top of the metal, gypsum, tectum or concrete roof deck which, in some instances, results in a weak connection. Once the lightweight insulating concrete has cured over a 12 to 36 hour period, the roof membrane system is applied.

Despite the widespread use of lightweight insulating concrete, there is a significant drawback associated with the attachment of the lightweight concrete to the underlying roof deck structure. In high wind conditions, and particularly hurricane force winds, there is a need for reinforced attachment of the lightweight insulating concrete top coat to the metal, gypsum, tectum or concrete roof deck in order to prevent the lightweight concrete from losing its bond to the roof deck which, otherwise, may cause the roof system to fail.

SUMMARY OF THE INVENTION

The present invention provides a reinforced attachment of the lightweight insulating concrete top coat to the underlying metal, gypsum, tectum or concrete roof deck. Anchoring devices are placed at spaced intervals, within three inch diameter holes formed through the EPS ridged board insulation to effectively anchor the top coat of lightweight insulating concrete to an underlying slurry coat of lightweight concrete and the roof deck. Each anchoring device includes a flat base plate and a threaded shank that is fixed to the base plate. The threaded shank extends upwardly and perpendicularly from a top of the base plate. The anchoring device may be fabricated from plastic, steel or aluminum and is installed by mechanically attaching the base plate to the underlying roof deck or by setting the base plate into the slurry coat of lightweight insulating concrete so that the threaded shank extends upwardly through the three inch diameter holes a formed in the EPS ridge board insulation. When the subsequently applied top coat of lightweight insulating concrete is poured, the EPS board and shanks of the anchoring devices are encapsulated within the top coat and slurry coat. With the threaded shanks extending upwardly from the slurry coat, through the EPS ridge board insulation and into the top coat, the top coat of lightweight insulating concrete is effectively anchored to the underlying slurry coat and roof deck to provide a reinforced attachment of the lightweight concrete top coat. Installation of the anchoring devices, in the manner described above, enhances the uplift performance of the lightweight concrete, thereby allowing the roof structure to withstand hurricane force winds.

BRIEF DESCRIPTION OF THE DRAWINGS

For a fuller understanding of the nature of the present invention, reference should be made to the following detailed description taken in conjunction with the accompanying drawings in which.

DETAILED DESCRIPTION OF THE PREFERRED EMBODIMENTS

Figure 1:
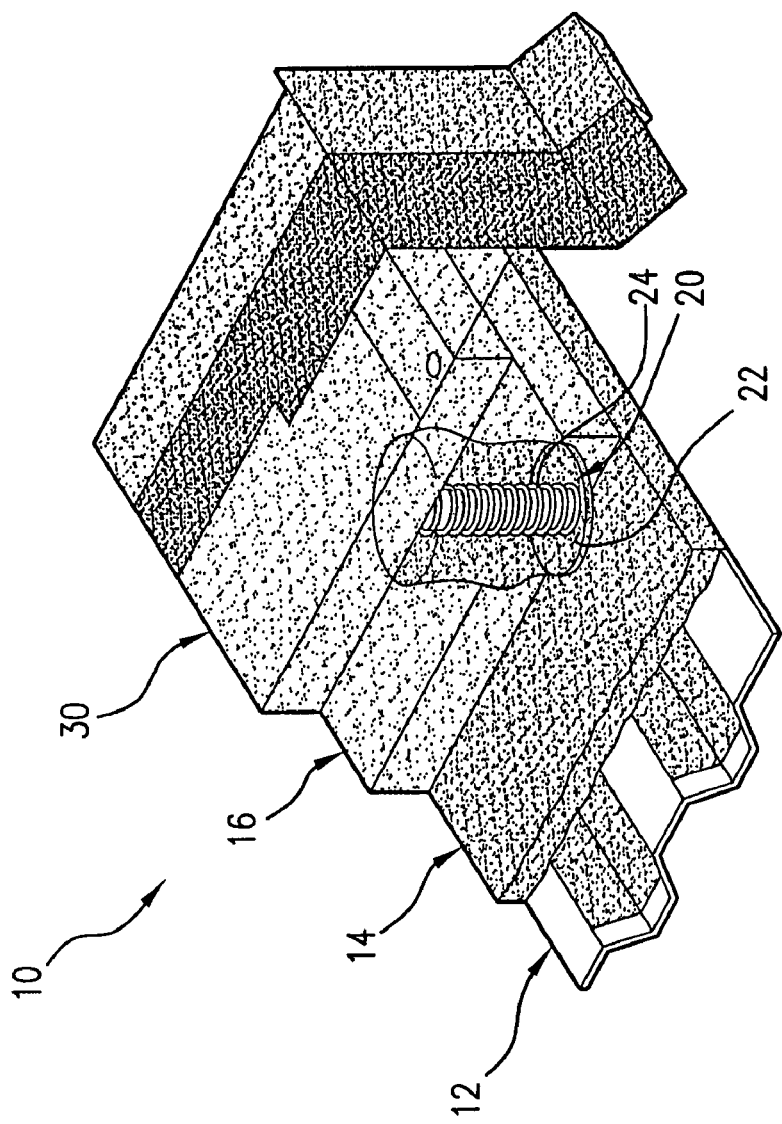
FIG. 1 is an isolated perspective view, in cross-section, illustrating reinforced attachment of a lightweight concrete top coat to a roof deck in a roof system using anchoring devices extending from the roof deck to the top coat.

As shown in FIG. 1, a roof system 10 includes a roof deck 12 that may be formed of metal, gypsum, tectum or concrete. A base slurry coat of lightweight concrete 14 is poured on top of the roof deck 12. Before the base slurry coat 14 cures, a layer of EPS board insulation 16 is placed on the slurry coat. The EPS board insulation 16 is provided with a spaced arrangement of 3 inch diameter holes formed through its thickness (i.e., between top and bottom sides).

Figure 2:
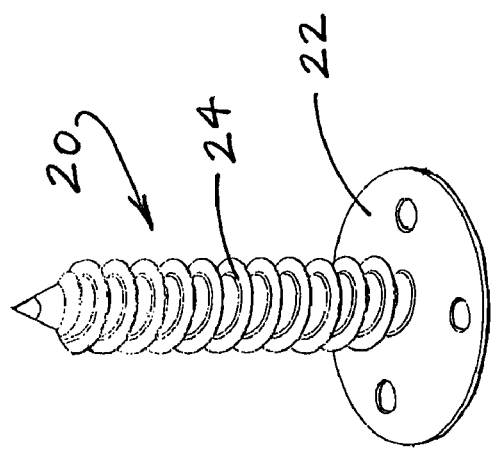
FIG. 2 is a perspective view of an anchoring device used to anchor the lightweight concrete top coat to the underlying base slurry coat of lightweight concrete and the roof deck.

A plurality of anchoring devices 20 are placed at spaced intervals; one anchoring device 20 within each of the 3 inch diameter holes formed through the EPS board insulation 16. As seen in FIG. 2, each anchoring device 20 includes a flat base 22 and a threaded shank 24 that is fixed to the base plate. The threaded shank 24 extends upwardly and perpendicularly from the top of the base plate 22. The threads on the shank spiral upwardly from the base plate to a distal end of the shank. In a preferred embodiment, the base plate 22 is circular and is ⅛ inch thick with a 2½ diameter. The threaded shank is approximately 2 inches long and 1¾ inch in diameter. The base plate 22 may be mechanically attached to the underlying roof deck 12 using conventional fasteners. Alternatively, the base plate 22 may be set in the slurry coat 14, through one of the holes in the EPS board insulation 16, so that the threaded shank 24 extends upwardly through the hole and above the EPS board insulation. A 2 inch deep top coat of lightweight insulating concrete 30 is poured on top of the EPS board insulation 16, filling the holes of the EPS board insulation and surrounding and encapsulating the threaded shank 24 and the EPS board insulation. With the base 22 of each of the anchoring devices 20 anchored to the roof deck 12 and the threaded shank 24 of each of the anchoring devices extending up through the holes in the EPS board insulation 16 and into the lightweight concrete top coat 30, the top coat 30 is effectively anchored to the roof deck 12. This serves to enhance the uplift performance of the lightweight concrete roof, thereby allowing the roof structure to withstand hurricane force winds without failure.

While the present invention has been shown and described in accordance with a preferred and practical embodiment thereof, it is recognized that departures from the instant disclosure are contemplated within the spirit and scope of the present invention.

What is claimed is:

1. A roof system comprising:
   a roof deck;
   a base layer of lightweight insulating concrete;
   a layer of expanded poly styrene board insulation including a top side, a bottom side and a spaced arrangement of holes formed through said board insulation from said top side to said bottom side, and said bottom side applied to said base layer of lightweight insulating concrete;
   a top layer of lightweight insulating concrete applied over said top side of said layer of board insulation and within said holes; and
   a plurality of anchoring devices structured and disposed for holding said top layer of lightweight insulating concrete anchored to said base layer of lightweight insulating concrete with said layer of expanded poly styrene board insulation sandwiched between said base layer and said top layer, said plurality of anchoring devices each including a base set into and anchored within said base layer of lightweight insulating concrete and a shank extending from the base and through a respectively aligned one of the holes in the board insulation and anchored into said top layer of lightweight insulating concrete.

2. The roof system as recited in claim 1 wherein each of said plurality of anchoring devices further comprises:
   a distal end of said shank; and
   a spiraling screw thread along said shank between said base and said distal end.

3. The roof system as recited in claim 2 wherein said base of each of said plurality of anchoring devices is flat.

4. The roof system as recited in claim 3 wherein said plurality of anchoring devices are formed of plastic.

5. The roof system as recited in claim 3 wherein said plurality of anchoring devices are formed of steel.

6. The roof system as recited in claim 3 wherein said plurality of anchoring devices are formed of aluminum.

7. A method of installing a roof system on a roof deck of a building structure comprising the steps of:
   applying a base slurry layer of a lightweight insulating concrete composition on the top of said roof deck to define a base layer;
   providing expanded poly styrene board insulation including a top side, a bottom side and a spaced arrangement of holes formed through said board insulation from said top side to said bottom side;
   applying said board insulation on to said base layer of lightweight insulating concrete composition prior to complete curing of said base layer of lightweight insulating concrete composition;
   providing a plurality of anchoring devices each including a base and a shank extending upwardly from the base;
   placing the base of each of said plurality of anchoring devices set within said applied base layer prior to curing of the lightweight insulating concrete composition of said base layer so that the shank of each of said plurality of anchoring devices extends upwardly through a respectively aligned one of the holes in the board insulation; and
   applying a top layer of lightweight insulating concrete composition over the top side of said board insulation and filling said top layer of lightweight insulating concrete composition within said holes so that the shanks of said plurality of anchoring devices are set within and become anchored to said top layer, and allowing said base layer and said top layer to cure so that said plurality of anchoring devices hold said top layer anchored to said base layer with said board insulation sandwiched between said base layer and said top layer.

* * * * *